(12) United States Patent
Muhlbauer et al.

(10) Patent No.: US 8,812,728 B2
(45) Date of Patent: Aug. 19, 2014

(54) ROUTING REQUESTS FOR LOCATION-TO-SERVICE TRANSLATION (LOST) SERVICES USING PROXY SERVER

(75) Inventors: Adam Muhlbauer, Bulli (AU); Anthony James Winterbottom, Gwynneville (AU); Martin Wyville Thomson, Keiraville (AU)

(73) Assignee: Andrew LLC, Hickory, NC (US)

( * ) Notice: Subject to any disclaimer, the term of this patent is extended or adjusted under 35 U.S.C. 154(b) by 261 days.

(21) Appl. No.: 13/232,292

(22) Filed: Sep. 14, 2011

(65) Prior Publication Data

US 2012/0066365 A1  Mar. 15, 2012

Related U.S. Application Data

(60) Provisional application No. 61/382,958, filed on Sep. 15, 2010.

(51) Int. Cl.
*G06F 15/173* (2006.01)
*H04L 29/08* (2006.01)

(52) U.S. Cl.
CPC ............ *H04L 67/16* (2013.01); *H04L 67/2814* (2013.01); *H04L 67/18* (2013.01)
USPC .......................................... 709/238; 709/227

(58) Field of Classification Search
None
See application file for complete search history.

(56) References Cited

U.S. PATENT DOCUMENTS

| | | | |
|---|---|---|---|
| 6,097,709 A | 8/2000 | Kuwabara | |
| 6,108,558 A | 8/2000 | Vanderspool, II | |
| 6,115,605 A | 9/2000 | Siccardo et al. | |
| 6,269,246 B1 | 7/2001 | Rao et al. | |
| 6,281,834 B1 | 8/2001 | Stilp | |
| 6,393,294 B1 | 5/2002 | Perez-Breva et al. | |
| 6,449,486 B1 | 9/2002 | Rao | |
| 6,591,112 B1 | 7/2003 | Siccardo et al. | |
| 6,782,265 B2 | 8/2004 | Perez-Breva et al. | |
| 6,944,465 B2 | 9/2005 | Spain et al. | |
| 7,116,987 B2 | 10/2006 | Spain, Jr. et al. | |
| 7,167,714 B2 | 1/2007 | Dressler et al. | |
| 7,233,799 B2 | 6/2007 | Spain, Jr. | |
| 7,250,907 B2 | 7/2007 | Krumm et al. | |
| 7,257,414 B2 | 8/2007 | Spain, Jr. et al. | |
| 7,260,186 B2 * | 8/2007 | Zhu et al. | 379/45 |
| 7,383,051 B2 | 6/2008 | Spain, Jr. et al. | |
| 7,433,652 B2 | 10/2008 | Durgin | |
| 7,433,695 B2 | 10/2008 | Gordon et al. | |

(Continued)

OTHER PUBLICATIONS

Rick Roberts, "Project: IEEE P802.15 Working Group for Wireless Personal Area Networks (WPANS)," Harris Corporation, Melbourne Florida, Oct. 4, 2004, pp. 1-11.

(Continued)

*Primary Examiner* — Ario Etienne
*Assistant Examiner* — Clayton R Williams
(74) *Attorney, Agent, or Firm* — Volentine & Whitt, PLLC

(57) ABSTRACT

A method implemented by a proxy server is provided for routing requests for a Location-to-Service Translation (LoST) service without traversing a forest node structure. The method includes receiving a request for the LoST service initiated by a client, the request including a location of a user device and a requested service; identifying an authoritative LoST server configured to service the requested service and bounded by a service boundary that includes the location included in the request; and directly forwarding the request to the identified authoritative LoST server, without routing through any other LoST server.

20 Claims, 5 Drawing Sheets

(56) References Cited

U.S. PATENT DOCUMENTS

| | | | |
|---|---|---|---|
| 7,460,505 | B2 | 12/2008 | Spain |
| 7,725,111 | B2 | 5/2010 | Dressler et al. |
| 7,734,298 | B2 | 6/2010 | Bhattacharya et al. |
| 7,753,278 | B2 | 7/2010 | Spain, Jr. et al. |
| 7,796,966 | B2 | 9/2010 | Bhattacharya et al. |
| 7,848,762 | B2 | 12/2010 | Gordon et al. |
| 7,899,467 | B2 | 3/2011 | Feuerstein et al. |
| 8,013,785 | B2 | 9/2011 | Bhattacharya et al. |
| 8,068,802 | B2 | 11/2011 | Bhattacharya et al. |
| 8,068,855 | B2 | 11/2011 | Dressler et al. |
| 8,106,817 | B2 | 1/2012 | Bhattacharya et al. |
| 8,106,818 | B2 | 1/2012 | Bhattacharya et al. |
| 8,155,394 | B2 | 4/2012 | Allegra et al. |
| 2004/0203539 | A1 | 10/2004 | Benes et al. |
| 2007/0211692 | A1* | 9/2007 | Boroski et al. ............... 370/351 |
| 2010/0142386 | A1* | 6/2010 | Snapp et al. ................ 370/250 |
| 2010/0166154 | A1* | 7/2010 | Peters ............................ 379/45 |
| 2010/0169479 | A1* | 7/2010 | Jeong et al. .................. 709/224 |
| 2011/0004672 | A1 | 1/2011 | Garcia-Martin et al. |
| 2011/0064205 | A1 | 3/2011 | Boni et al. |
| 2011/0092182 | A1* | 4/2011 | Hilden et al. .............. 455/404.2 |
| 2011/0201299 | A1* | 8/2011 | Kamdar ...................... 455/404.1 |
| 2011/0206036 | A1* | 8/2011 | DeWeese ....................... 370/352 |
| 2012/0023247 | A1* | 1/2012 | Minamizawa ................ 709/229 |

OTHER PUBLICATIONS

Stephanie Bell, A Beginners Guide to Uncertainty of Measurement, The National Physics Laboratory of the United Kingdom of Great Britain and Northern Ireland, Teddington, Middlesex, UK, 2001, pp. 1-41.

T. Hardie et al., " LoST: A Location-to-Service Translation Protocol," Request for Comments (RFC) 5222, Standards Track, Aug. 2008, pp. 1-69.

H. Schulzrinne et al., "Discovering Location-to-Service Translation (LoST) Servers Using the Dynamic Host Configuration Protocol (DHCP)," Request for Comments (RFC) 5223, Standards Track, Aug. 2008, pp. 1-8.

* cited by examiner

ROUTING REQUESTS FOR LOCATION-TO-SERVICE TRANSLATION (LOST) SERVICES USING PROXY SERVER

PRIORITY STATEMENT

Priority is claimed from provisional patent application No. 61/382,958, filed Sep. 15, 2010, in the United States Patent and Trademark Office, the disclosure of which is hereby incorporated by reference in its entirety.

BACKGROUND AND SUMMARY

Location-to-Service Translation (LoST) protocol provides a request-response protocol for mapping a given location to a service identifier, and is described in "LoST: A Location-to-Service Translation Protocol," Request for Comment (RFC) 5222 (August 2008), the subject matter of which is hereby incorporated by reference. Generally, the LoST protocol is an XML-based protocol for mapping location information and service identifiers to service contact uniform resource identifiers (URIs) and domain names corresponding to LoST services. The service contact URIs and domain names enable a requesting user device or client to contact the entity providing the LoST service. For example, the LoST protocol may be used to identify a Public Safety Answering Point (PSAP) having jurisdiction over a client based on predetermined boundaries serviced by the PSAP and the location of the client when a request for emergency assistance is made.

The LoST protocol describes a mechanism for deployment of a network of LoST servers, which are configured to forward a request or query from an originating client (e.g., user device) through a "forest structure" of LoST servers. The query is ultimately directed to an appropriate authoritative LoST server, which is the LoST server capable of answering or resolving the client's request. The network of LoST servers may operate recursively or iteratively, on a request-by-request basis. In recursive mode, each LoST server initiates a query on behalf of a previous requester, and returns the result of the query to the previous requester in a corresponding response message. For example, each LoST server may initiate a new query message in response to an initial query message from the original client until the appropriate authoritative LoST server is contacted. In iterative mode, each LoST server returns a redirection response message to the client, indicating the identity of the next LoST server to be queried (if the current LoST server cannot resolve the initial query), until the authoritative LoST server is ultimately identified and queried by the client.

FIG. 1 is a simplified block diagram illustrating a conventional LoST protocol network, showing an example deployment implementing the recursive mode.

Referring to FIG. 1, LoST protocol network 100 includes a forest structure of LoST servers 121-123 and authoritative LoST servers 131-132. In the depicted example, user device 110 accesses authoritative LoST server 131 through sequential queries by intervening LoST servers 121 and 123 of the LoST protocol network 100, in response to an initial query from the user device 110, as indicated by the arrows. More particularly, the user device 110 (acting as a client) sends a query message containing location information and a service identifier, e.g., encoded as a Uniform Resource Name (URN), to servicing LoST server 121. The LoST server 121 attempts to map the location information and the service identifier to one or more URIs in a database. If the LoST server 121 is unable to resolve the query message (as is the case shown in FIG. 1), the LoST server 121 sends a query message to LoST server 123 (now acting as a client), including the location information and the service identifier.

The LoST server 123 similarly attempts to map the location information and the service identifier to one or more URIs in its database, and if it is unable to resolve the query message (as is the case shown in FIG. 1), the LoST server 123 sends a query message to authoritative LoST server 131, including the location information and the service identifier. By definition, the authoritative LoST server 131 acts only as a server (as opposed to sometimes acting as a client), and is able to successfully resolve the location information and the service identifier to a URI or set of URIs. An appropriate response message is returned to the client 110 along a reverse path through the LoST servers 121 and 123.

Along the forward routing path, each LoST network node populates a "path element" included in the query messages with an identifying "via element," which may be a corresponding URN, for example. In other words, each of the user device 110, the LoST servers 121 and 123, and the authoritative LoST server 131 adds a via element to the path element identifying itself on the forward path. The path element is not modified on the reverse routing path, although the path element is included in the response messages, enabling the LoST network nodes to follow the reverse order of the via elements. The path element thereby prevents loops and allows tracing of query and response paths.

The conventional approach described above ties up resources and is otherwise time consuming, which may be particularly problematic in emergency situations. Each LoST server in the chain must check its database for mapping purposes, and launch a query to the next LoST server identified.

Accordingly, in a representative embodiment, a method implemented by a proxy server is provided for routing requests for a Location-to-Service Translation (LoST) service without traversing a forest node structure. The method includes receiving a request for the LoST service initiated by a client, the request including a location of a user device and a requested service; identifying an authoritative LoST server configured to service the requested service and bounded by a service boundary that includes the location included in the request; and directly forwarding the request to the identified authoritative LoST server, without routing through any other LoST server.

In another representative embodiment, a method implemented by a proxy server is provided for directly routing requests for a LoST service. The method includes receiving a LoST query message initiated by a client, the LoST query message including an identifier of a requested LoST service, a location of a user device requesting the requested LoST service, and a client identifier corresponding to the client; identifying an authoritative LoST server configured to service the requested LoST service for the location of the user device; modifying the LoST query message to replace the client identifier with a proxy identifier corresponding to the proxy server; and directly forwarding the modified LoST query message to the identified authoritative LoST server.

In yet another representative embodiment, a computer readable medium storing code, executable by a computer processor in a proxy server, is provided for routing requests for a LoST service without traversing a forest node structure. The computer readable medium includes receiving code for receiving a request for the LoST service initiated by a client, the request including a location of a user device and a requested service; identifying code for identifying an authoritative LoST server configured to service the requested service and bounded by a service boundary that includes the location included in the request; and routing code for directly forwarding the request to the identified authoritative LoST server, without routing through any other LoST server.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

Generally, according to various embodiments, a method is provided for a proxy server to learn correct paths to one or more authoritative LoST servers, and to provide the ability to route directly to the authoritative LoST servers from a LoST client, i.e., without having to first access one or more recursive or iterative LoST servers in a forest structure. Accordingly, LoST services may be deployed according to various embodiments in environments where a forest structure of recursive or iterative LoST servers is not deployed.

Figure 1:
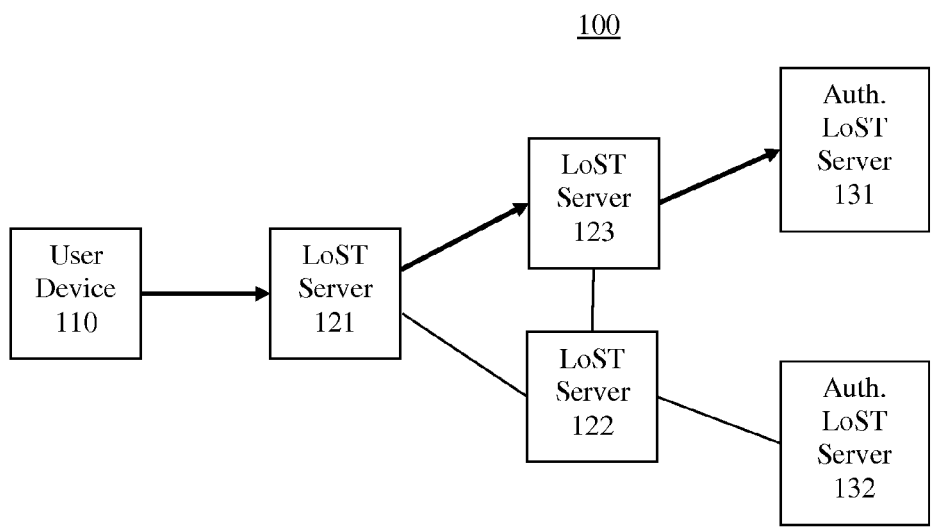
FIG. 1 is a simplified block diagram illustrating a conventional LoST protocol network.
Figure 2:
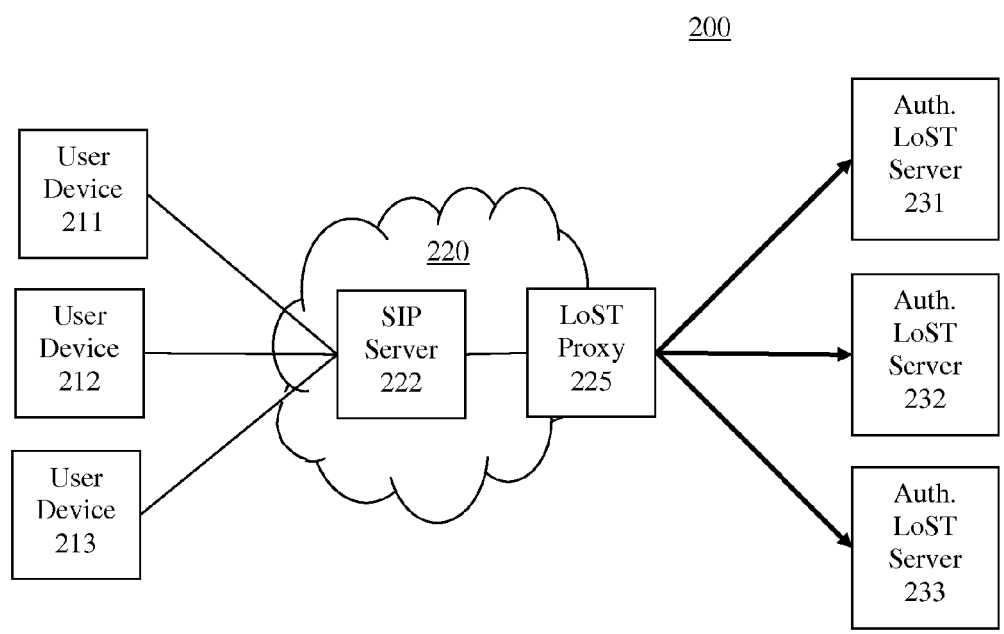
FIG. 2 is a simplified block diagram illustrating a LoST protocol network configured for directly routing requests to an authoritative LoST server, according to a representative embodiment.

FIG. 2 is a simplified block diagram illustrating a LoST protocol network, according to a representative embodiment.

Referring to FIG. 2, LoST protocol network 200 includes one or more authoritative LoST servers, indicated by representative authoritative LoST servers 231-233, which are accessible through communications network 220. The LoST protocol network 200 does not include a forest structure of LoST servers, in addition to the illustrative authoritative LoST servers 231-233, since such a forest structure is not needed for sending queries from representative user devices 211-213 to a corresponding one of the authoritative LoST servers 231-233 able to resolve the requests. This is particularly useful when implementation of a forest structure is not possible, for example, when authoritative LoST servers are isolated from one another. More particularly, the LoST protocol requires that either the LoST client or all of the LoST servers be able to reach all the other LoST servers in order to perform iterative or recursive queries, respectively. In the configuration depicted in FIG. 2, however, connectivity to LoST servers may be constrained, yet communication with the authoritative LoST servers 231-233 can still be established. Also, the depicted configuration may be used to provide LoST services even when the authoritative LoST servers 231-233 are controlled by a different entity than the service provider (e.g., such as a private emergency services provider) and/or the network provider, but the user devices 211-213 must still be directed to the correct one of the authoritative LoST servers 231-233.

In the depicted embodiment, the communication network 220 is a Session Initiation Protocol (SIP) network, although the communication network 220 may be any type of communication network, or even part of the LoST protocol network 200, without departing from the scope of the present teachings. The communication network 220 includes SIP server 222 and proxy server 225, configured to communicate with the LoST protocol network 200, which may be the same network or a separately administered network. The proxy server 225 thus enables provision of one or more services to the user devices 211-213, such as an emergency service for directing emergency calls from the user devices 211-213 to a PSAP having appropriate jurisdiction based on predetermined civic and/or geodetic boundaries.

The proxy server 225 is configured to receive requests from the user devices 211-213 for LoST services, either directly or through intermediate communication network servers (not shown), such as the SIP server 222. For purposes of implementing the LoST protocol, the SIP server 222 is considered the LoST client, unless the user devices 211-213 are communicating directly with the proxy server 225, in which case the user devices 211-213 are considered the LoST clients. The user devices 211-213 may be mobile devices, for example, such as wireless telephones, personal digital assistants (PDAs), laptop or tablet computers, and the like. Regardless, the user devices 211-213 initiate requests for LoST services resolvable by one of the authoritative LoST servers 231-233.

More particularly, the LoST client initiates a query message, which includes location information of the initiating user device 211-213 and a service identifier, e.g., URN, corresponding to the requested LoST service. One of the authoritative LoST servers 231-233 is able to resolve the query message. The proxy server 225 identifies the appropriate authoritative LoST server 231-233, e.g., based on the location of the requesting user device 211-213 at the time the request is sent and the identity of the requested service. For example, the request may be an emergency services request from the user device 211, in which case the communications network 220 and the LoST protocol network 200 provide mapping functions for routing the request to the jurisdictionally appropriate PSAP for emergency services. However, other types of services may be provided, without departing from the scope of the present teachings. Furthermore, the proxy server 225 of the communications network 200 may be configured to discover or to learn automatically the paths to the correct authoritative LoST servers 231-233, as discussed below.

It is generally desirable to simplify configuration patterns and/or query patterns of the LoST client (e.g., the SIP server 222), to the extent possible. For example, configuration for just one authoritative LoST server and a single request-response interaction is most efficient, even when there are potentially multiple authoritative LoST servers, such as authoritative LoST servers 231-233, which is accomplished by the proxy server 225. A LoST server, rather than the proxy server 225, requires more complex behavior, such as synchronization of service mapping data, which is not required for implementation of the proxy server 225, as discussed herein.

Operation of the proxy server 225 is discussed below with reference to FIG. 3, which is a flow diagram illustrating a method of directly routing LoST requests to an appropriate authoritative LoST server without traversing a forest structure, according to a representative embodiment. Although the method illustrated in FIG. 3 is implemented by the proxy server 225 in the service provider network 220, it is understood that the method may be alternatively implemented by any of various servers and/or computer processors accessible by the user devices 211-213 and the authoritative LoST servers 231-233, without departing from the scope of the present teachings.

Figure 3:
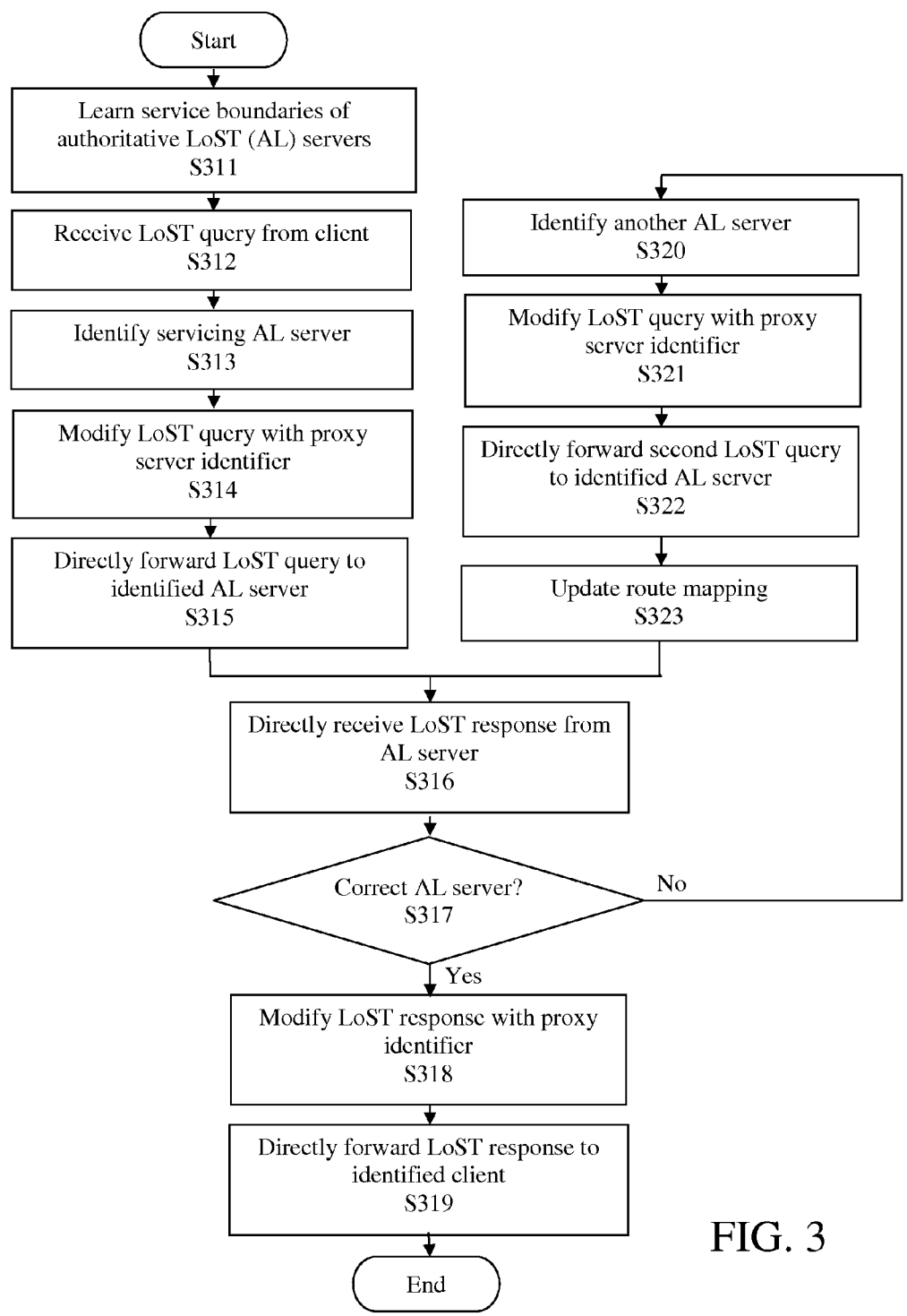
FIG. 3 is a flowchart illustrating a method for directly routing requests to an authoritative LoST server, according to a representative embodiment.

In block S311 of FIG. 3, the proxy server 225 learns a predetermined service boundary (e.g., jurisdictional boundary) corresponding to each of the authoritative LoST servers 231-233, and stores the service boundaries in a database. The service boundary indicates a region, in civic and/or geodetic form, for which the authoritative LoST server 231-233 is responsible with respect to one or more services. For example, civic form may be provided in street addresses and geodetic form may be provided in geodetic coordinates, as would be apparent to one of ordinary skill in the art. The services may include emergency services or various commercial services, for example. Thus, the proxy server 225 stores a set of service boundaries with respect to each authoritative LoST server 231-233 for each service provided through the authoritative LoST server 231-233, respectively. The services for which each of the authoritative LoST server 231-233 is configured to implement are stored in the database, as well.

In various embodiments, the proxy server 225 may be configured to enable the network and/or LoST service provider to manually set coarse location route mappings to speed up the route learning process. For example, the coarse location route mappings may be initially programmed into a database associated with the proxy server 225, in which case the proxy server 225 need only learn service boundaries and/or services that change or that are not included in the initial programming. For example, the routing may be adapted (e.g., new services and/or service boundaries are learned dynamically) as the location for which an authoritative LoST Server is responsible changes or as authoritative LoST servers become unavailable, e.g., as discussed below with reference to block S323.

In block S312, a query message is received by the proxy server 225 from a LoST client via the service provider network 220, the query message being formatted according to the LoST protocol, discussed above. For example, the query message may contain civic and/or geodetic location information identifying the location of the querying user device (e.g., assumed to be user device 211 in the present example), at the time of the request and a service identifier corresponding to an emergency service. The LoST client may be the user device 211 initiating the request for the LoST service, or the LoST client may be an intermediate server in the communication network, such as the SIP server 222, which is in communication with the user device 211 initiating the request for the LoST service.

The proxy server 225 identifies the servicing authoritative LoST server 231-233 that will provide the LoST service in block S313. That is, the proxy server 225 extracts the service identifier from the query message and identifies which of the authoritative LoST servers (e.g., authoritative LoST servers 231-233) implements the requested service. Also, the proxy server 225 extracts the location information from the query message, indicating the location of the requesting user device 211, and compares the extracted location information to the service boundaries of the authoritative LoST servers 231-233, respectively, in order to identify the authoritative LoST server 231-233 that provides the requested service to the extracted location. In other words, with respect to each authoritative LoST server 231-233, the proxy server 225 determines whether the location contained within the LoST query message is bounded by the learned service boundary of that particular authoritative LoST server 231-233. For purposes of explanation, it is assumed that authoritative LoST server 231 is determined to be the servicing authoritative LoST server in the present example.

In block S314, the proxy server 225 modifies the LoST query message to include its own identifier as the client identifier. The proxy server 225 then directly forwards the modified LoST query message in block S315 to the identified authoritative LoST server 231 that services the location contained within the LoST query message. Directly forwarding means that the LoST query message is not routed through any other LoST server, including either of the authoritative LoST servers 232 and 233. In other words, there is no forest structure of LoST servers in the LoST network 200. Further, because the proxy server 225 modified the LoST query message to include its own identifier as the client identifier in block S314, the authoritative LoST server 231 believes that it has received the LoST query message directly from the client. An advantage of this is that any processing performed by client or the authoritative LoST server 231 with respect to the identity of its peer does not see the identity of a remote peer (e.g., authoritative LoST server 231 does not know about the SIP server 222 or the end user 211, and vice versa). This ensures, for example, that the SIP server 222 and/or the end user 211 do not attempt to directly contact the authoritative LoST server 231, which attempt might fail.

In block S316, the proxy server 225 directly receives a LoST response message from the authoritative LoST server 231. Directly receiving means that the LoST response message is not routed through any other LoST server, including either of the authoritative LoST servers 232 and 233. Again, there is no forest structure of LoST servers in the LoST network 200. The proxy server 225 determines in block S317 whether the authoritative LoST server 231 is the correct authoritative LoST server for implementing the requested LoST service. For example, the LoST response message received in block S316 may indicate that the authoritative LoST server 231 was not able to resolve the query message. For example, the service boundaries and/or services of the authoritative LoST server 231 may have changed, or the authoritative LoST server 231 may be inoperable or malfunctioning in some way. Alternatively, the proxy server 225 simply may receive no response from the authoritative LoST server 231.

Regardless of the cause, in an embodiment, when it is determined that the authoritative LoST server 231 is not the correct authoritative LoST server (block S317: No), the proxy server 225 attempts to identify another servicing authoritative LoST server in block S320. For example, when an authoritative LoST server can not be identified or when the initially identified authoritative LoST server provides a response indicating that it is unable to serve the LoST query, as discussed above, the proxy server 225 may send the LoST query to all known authoritative LoST servers 231-233. Sending the LoST query to all known authoritative LoST servers 231-233 may be performed in parallel, in series or a mixture of both, depending on performance constraints.

When a successful response is received from one of the authoritative LoST servers (e.g., authoritative LoST server 232), the proxy server 225 makes a second request to the authoritative LoST server 232. That is, the proxy server 225 modifies the LoST query message in block S321 to include its own identifier as the client identifier in the LoST request message and then directly forwards the modified LoST query message in block S322 to the identified authoritative LoST server 232, as discussed above with reference to blocks S314-S315. The process then repeats blocks S316 and S317, as discussed above, with respect a LoST response received directly from the alternative authoritative LoST server 232.

In block S323, the proxy server 225 updates its route mappings to indicate that the corresponding service boundaries are serviced by the authoritative LoST server 232, as opposed to the authoritative LoST server 231, which is part of the learning process for accommodating future transactions. Although shown as following the forwarding operation in block S322, it is understood that the route mappings may be updated at various points in the process without departing from the scope of the present teachings. For example, the proxy server 225 may update its route mappings immediately after the alternative authoritative LoST server 232 is identified in block S321, or not until after the alternative authoritative LoST server 232 is confirmed as the correct alternative authoritative LoST server in block S317.

Returning to block S317, when it is determined that the authoritative LoST server 231 is the correct authoritative LoST server (block S317: Yes), the proxy server 225 modifies the LoST response received from the authoritative LoST server 231 to include its own identifier as the authoritative LoST server identifier. The proxy server 225 also changes the client identifier from its own identifier back to the original client identifier, which had been changed in operation S314. The proxy server 225 then directly forwards the modified LoST response message to the LoST client in block S319. Directly forwarding means that the modified LoST response message is not routed through any other LoST server. Of course, if the process had identified an alternative authoritative LoST server (e.g., authoritative LoST server 232) through blocks S320-S323, as discussed above, blocks S318-S319 would be performed based on the LoST response message received from the alternative authoritative LoST server.

Notably, in various embodiments, the LoST request message from the user device 211 may include an attribute asking for civic location validation, for example. In this case, the LoST response message ultimately received from the servicing authoritative LoST server may contain an indication of which civic fields are valid. The proxy server 225 may take advantage of this information, and update its route mapping for the authoritative LoST servers 231-233 to include the values of the valid civic fields. Thus, future requests that include location information that is bounded by the service boundaries of the authoritative LoST server 231, for example, will be sent by the proxy server 225 directly to the alternative authoritative LoST server 232. This eliminates the need for the second request from the proxy server 225, discussed above with reference to blocks S321-S322, at the cost of a potential increase in the number of route mappings maintained by the proxy server 225.

Figure 4:
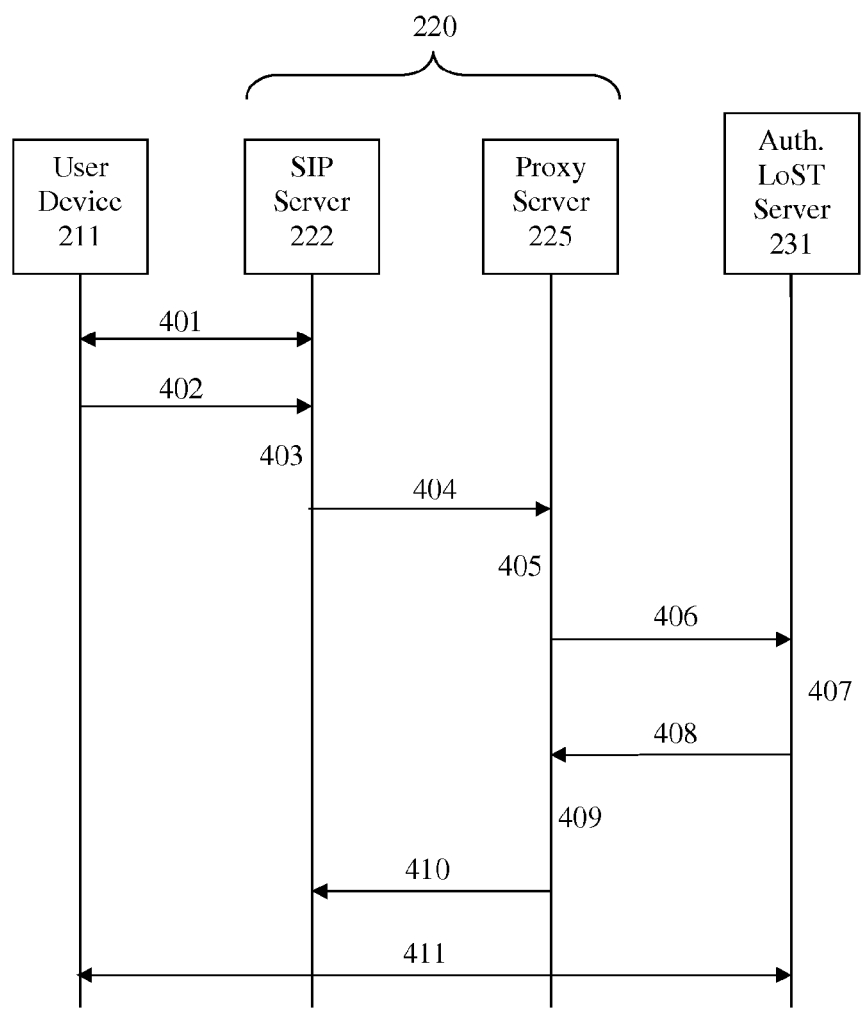
FIG. 4 is a call flow diagram illustrating a procedure for directly routing requests to an authoritative LoST server, according to a representative embodiment.

FIG. 4 is a call flow diagram illustrating a procedure for directly routing requests to an authoritative LoST server, according to a representative embodiment.

Referring to FIG. 4, user device 211 initiates a request for a LoST service, for example, by dialing a number associated with an emergency service or the like. For purposes of discussion, it may be assumed that the user device 211 is being serviced by a communication network (e.g., communication network 220) implemented using SIP architecture, although other signaling protocols may be included without departing from the scope of the present teachings. Thus, the user device 211 initiates a communication session in operation 401 by sending a SIP INVITE request to representative SIP server 222 in the communications network 220. The SIP server 222 returns a response to which the user device 211 replies with an ACK message, completing the handshake between the user device 211 and the SIP server 222.

Once the communication session is established, the user device 211 sends a LoST query message to the SIP server 222 in operation 402 requesting a LoST service. As discussed above, the LoST query message includes location information, which provides the civic or geodetic location of the user device 211, and a service identifier, which provides a URN of the requested service. The query message also includes a via element identifying the user device 211 in the path element of the query message. As discussed above, the via element may include a URN corresponding to the user device 211, for example. In operation 403, the SIP server 222 recognizes the LoST query message and inserts a corresponding via element in the path element. The SIP server 222 also determines to route the query message to the proxy server 225 through various techniques, such as static configuration or LoST service discovery, described for example in "Discovering Location-to-Service Translation (LoST) Servers Using the Dynamic Host Configuration Protocol (DHCP)," RFC 5223 (August 2008), the subject matter of which is hereby incorporated by reference.

In operation 404, the SIP server 222 routes the query message to the proxy server 225. The proxy server 225 extracts the location information and the service identifier from the query message in operation 405, and queries its database to identify the authoritative LoST server that has service boundaries corresponding to location information and that provides the requested service (e.g., authoritative LoST server 231, in the present example). Also in operation 405, the proxy server 225 modifies the query message in manner that indicates to the authoritative LoST server 231 that the query message is being received directly from the LoST client (e.g., server SIP 222 in the present example), as opposed to an intervening server. For example, instead of adding its identifier as a separate via element in the path element of the query message, the proxy server 225 may replace the via element added by the SIP server 222 with another via element identifying the proxy server 225. Thus, for example, the (simplified) path element <222, 211> received from the SIP server 222 may be modified to path element <225, 211>. The proxy server 225 forwards the modified query message to the authoritative LoST server 231 in operation 406. The proxy server 225 maintains some state with regard to the query message for subsequent processing of a corresponding response message, discussed below.

In operation 407, the authoritative LoST server 231 extracts the location information and the service identifier from the query message, and confirms that is provides the requested service for the identified location. That is, the authoritative LoST server 231 resolves the query message by mapping the location information and the service identifier to one or more service contact URIs and/or domain names in its database. If the authoritative LoST server 231 cannot resolve the query message, it sends a return message to the proxy server 225 denying the query, and the proxy server 225 updates its database accordingly, thus dynamically learning the correct paths, as discussed above. Otherwise, the authoritative LoST server 231 provides one or more service contact URIs and/or domain names in a response, which are accessed to provide the requested LoST services, e.g., by establishing communication with a PSAP having jurisdiction over location of the user device 211

The authoritative LoST server 231 then generates a response message, which includes the service contact URIs and/or domain names, along with optional information, such as hints about the service boundary, and sends the response message back to the proxy server 225 in operation 408. Like the query message, the response message includes a path element that contains the via elements provided in the query message (in the same order), as well as an additional via element identifying the authoritative LoST server 231. Thus, for example, the response message may include path element <231, 225, 211>.

In operation 409, the proxy server 225 modifies the response message in manner that indicates to the client (e.g., SIP server 222) that the response message is being received directly from the authoritative LoST server 231, as opposed to an intervening server. For example, the proxy server 225 may replace the via element added by the authoritative LoST server 231 with another via element identifying the proxy server 225, and the proxy server 225 may replace its via element added on the forward path with another via element identifying the SIP server 222 (which was the via element in the query message originally replaced by the proxy server 225 on the forward path in operation 405). Thus, for example, the path element <231, 225, 211> received from the authoritative LoST server 231 may be modified to path element <225, 222, 211>. The proxy server 225 forwards the modified response message to the SIP server 222 in operation 410.

In operation 411, the SIP server 222 uses the modified response message to complete the SIP signaling process initiated by the user device 211 in operation 401, connecting the user device 211 with the authoritative LoST server 231. More particularly, the SIP server 222 is the ultimate LoST client in the depicted arrangement. For example, when the user device 211 initiates the call for a LoST service in operation 401, such as an emergency call, the SIP server 222 determines the route to the correct destination (e.g., authoritative LoST server 231) using the LoST protocol, as discussed above. Once the SIP server 222 learns the route and destination in operation 410, it continues the call signaling in operation 411. In an alternative case, the user device 211 may initiate the LoST query before initiating the emergency call (or a call to another service). The user device 211 is then able to communicate with the authoritative LoST server 231 for implementation of the requested LoST service.

Figure 5:
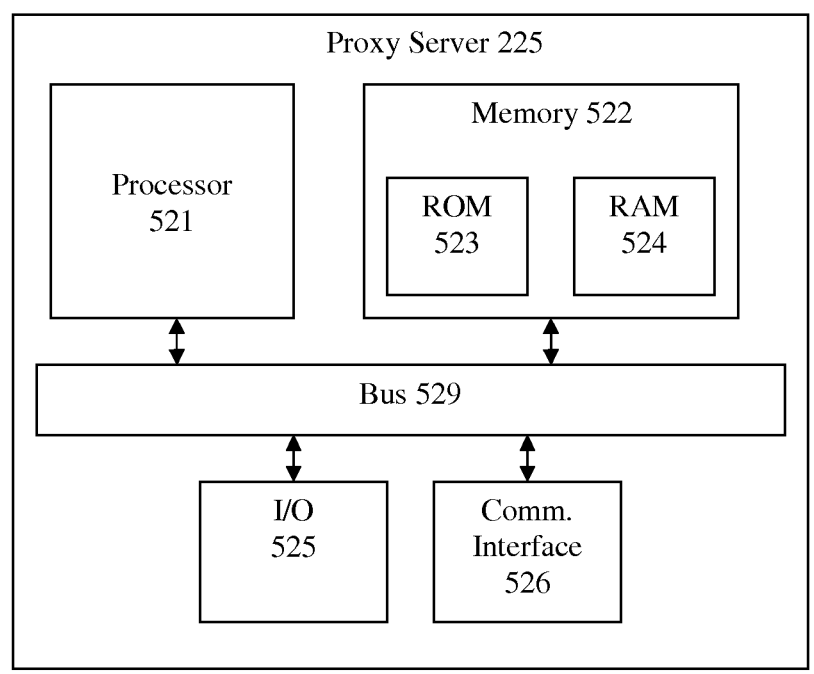
FIG. 5 is a functional block diagram illustrating a processing device for directly routing requests to an authoritative LoST server, according to a representative embodiment.

All or part of the various process operations described with reference to FIGS. 3 and 4 may be performed by a processing device or server, such as the proxy server 225. FIG. 5 is a functional block diagram illustrating such a processing device (e.g., indicated for purposes of explanation as proxy server 225), which is configured to execute an algorithm and/or process for directly routing requests to an authoritative LoST server, according to a representative embodiment. Although the proxy server 225 is shown and discussed below, it is understood that other servers, computers or nodes, such as each of the clients 211-213, the SIP server 222 and/or the authoritative LoST servers 231-233, may be configured in a similar manner, at least with respect to processing and storage functionality.

The various "parts" may be physically implemented using a software-controlled controller or microprocessor, e.g., processor 521, hard-wired logic circuits, firmware, or a combination thereof. Also, while the parts are functionally segregated for explanation purposes, they may be combined variously in any physical implementation.

In the depicted embodiment, the proxy server 225 includes processor 521, memory 522, bus 529 and various interfaces 525-526. The processor 521 is configured to execute one or more logical or mathematical algorithms, including LoST request routing and learning processes of the embodiments described herein, in conjunction with the memory 522. The processor 521 may be constructed of any combination of hardware, firmware or software architectures, and include its own memory (e.g., nonvolatile memory) for storing executable software/firmware executable code that allows it to perform the various functions. Alternatively, the executable code may be stored in designated memory locations within memory 522, discussed below. In an embodiment, the processor 521 may be a central processing unit (CPU), for example, and may execute an operating system.

The memory 522 may be any number, type and combination of external and internal nonvolatile read only memory (ROM) 523 and volatile random access memory (RAM) 524, and stores various types of information, such as signals and/or computer programs and software algorithms executable by the processor 521 (and/or other components). As generally indicated by ROM 523 and RAM 524, the memory 522 may include any number, type and combination of tangible computer readable storage media, such as a disk drive, an electrically programmable read-only memory (EPROM), an electrically erasable and programmable read only memory (EEPROM), a CD, a DVD, a universal serial bus (USB) drive, and the like.

In addition, the proxy server 225 may include one or more communication interfaces, indicated by representative communications interface 526, e.g., to enable communications with one or more components of the service providers network 220. The communications may be provided to the processor 521 and/or the memory 522 via bus 529. In various embodiments, the communication interface 526 includes one or more types of interfaces, such as wireless or wired Ethernet, TCP, ATM, or MTP, for example. However, the number, types and arrangement of interfaces may vary without departing from the scope of the present teachings.

A user such as the network provider and/or other computers may interact with the proxy server 225 using various input device(s) through I/O interface 525. The input devices may include a keyboard, key pad, a track ball, a mouse, a touch pad or touch-sensitive display, and the like. Also, various information may be displayed on a display (not shown) through a display interface (not shown), which may include any type of graphical user interface (GUI).

Further, in various embodiments, the process steps depicted FIGS. 3 and 4 may be incorporated within one or more processing modules of a device, such as the proxy server 225. However, the modules may be executable by any other server, computer or node having access to the clients 211-213, server 221 and/or the authoritative LoST servers 231-233, without departing from the scope of the present teachings. The modules may be implemented as any combination of software, hard-wired logic circuits and/or firmware configured to perform the designated operations. Software modules, in particular, may include source code written in any of a variety of computing languages, such as C++, C# or Java, and are stored on tangible computer readable storage media, such the computer readable storage media discussed above with respect to memory 522, for example.

Thus, according to various embodiments, a client is able to route a LoST request directly to an authoritative LoST server, without relying on a complex forest structure. It is advantageous for more controlled environments, e.g., where the authoritative LoST server is controlled by a different party than the service provider (and/or the communication network provider), but the service provider still needs to direct clients to the correct authoritative server. For example, this may occur where the LoST servers that are operated in different areas are not coordinated, or where a forest guide structure has not been deployed.

Generally, in accordance with various embodiments, methods are provided to directly route LoST requests to authoritative LoST servers without traversing a forest node structure. Also, methods are provided to automatically and dynamically learn for which region an authoritative LoST server is responsible during use. A LoST protocol civic address validation request may be utilized to learn where to route civic address request, thus potentially speeding up future LoST service requests. Also, methods are provided for naturally adapting the routing as the location for which a authoritative LoST server is responsible changes. A central interface may be provided to clients when using multiple authoritative LoST servers.

While specific embodiments are disclosed herein, many variations are possible, which remain within the concept and scope of the invention. Such variations would become clear after inspection of the specification, drawings and claims herein. The invention therefore is not to be restricted except within the scope of the appended claims.

What is claimed is:

1. A method for routing requests from a client for a Location-to-Service Translation (LoST) service, the method comprising:
   receiving a request for the LoST service at a proxy server initiated by the client, the request including a location of a user device and a requested service;
   identifying at the proxy server an authoritative LoST server configured to service the requested service and bounded by a service boundary that includes the location included in the request;
   retrieving an identifier of the identified authoritative LoST server; and
   directly forwarding the request for the LoST service from the proxy server to the identified authoritative LoST server using the retrieved identifier, without routing through any other LoST server of a plurality of LoST servers in a forest node structure.

2. The method of claim 1, further comprising:
   initially learning service boundaries of the plurality of authoritative LoST servers, including the service boundary of the identified authoritative LoST server, each of the service boundaries indicating a region for which a corresponding authoritative LoST server of the plurality of authoritative LoST servers is responsible.

3. The method of claim 1, further comprising:
   modifying the request from the client to replace a client identifier associated with the client with a proxy identifier associated with the proxy server.

4. The method of claim 3, wherein the modified request indicates to the authoritative LoST server that the proxy server is the client that initiated the request.

5. The method of claim 1, further comprising:
   receiving a response from the identified authoritative LoST server containing at least one identifier corresponding to the requested LoST service;
   directly forwarding the response to the client, without routing through any other LoST server; and
   establishing a connection between the user device and the authoritative LoST server using the response.

6. The method of claim 5, wherein the modified response indicates to the client that the proxy server is the identified authoritative LoST server that initiated the response.

7. The method of claim 5, wherein the at least one identifier comprises at least one of a service contact uniform resource identifier (URI) and a domain name.

8. The method of claim 1, wherein the client initiating the request comprises a Session Initiation Protocol (SIP) server having established a communication session with the user device.

9. A method for directly routing requests from a client for a Location-to-Service Translation (LoST) service, the method comprising:
   receiving a LoST query message initiated by the client at a proxy server, the LoST query message including an identifier of a requested LoST service, a location of a user device requesting the requested LoST service, and a client identifier corresponding to the client;
   identifying at the proxy server an authoritative LoST server configured to service the requested LoST service for the location of the user device;
   retrieving an identifier of the identified authoritative LoST server;
   modifying the LoST query message to replace the client identifier with a proxy identifier corresponding to the proxy server; and
   directly forwarding the modified LoST query message from the proxy server to the identified authoritative LoST server using the retrieved identifier without routing through any other LoST server of a plurality of LoST servers in a forest node structure.

10. The method of claim 9, further comprising:
    receiving a LoST response message initiated by the identified authoritative LoST server, the LoST response message including a service contract identifier of the requested LoST service, and an authoritative LoST server identifier corresponding to the authoritative LoST server;
    modifying the LoST response message to replace the proxy identifier with the client identifier, and to replace the authoritative LoST server identifier with the proxy identifier; and
    directly forwarding the modified LoST response message to the client.

11. The method of claim 9, further comprising:
    identifying an alternative authoritative LoST server when the identified authoritative LoST server is unable to resolve the LoST query message.

12. The method of claim 11, wherein identifying the alternative authoritative LoST server comprises:
    sending the query message to a plurality of alternative authoritative LoST servers;
    receiving a successful response from one of the plurality of alternative authoritative LoST servers;
    modifying the LoST query message to replace the client identifier with the proxy identifier; and
    directly forwarding the modified LoST query message to the one of the plurality of alternative authoritative LoST servers.

13. The method of claim 12, further comprising:
    updating route mapping of the proxy server to indicate that the one of the plurality of alternative authoritative LoST servers has a corresponding service boundary that includes the location included in the query message.

14. The method of claim 10, wherein the LoST query message further includes an attribute requesting civic location validation, and the LoST response message further includes an indication of which civic fields are valid.

15. The method of claim 14, further comprising:
updating route mapping of the proxy server to include values of the valid civic fields.

16. The method of claim 10, wherein the client identifier is included in a forward path element of the LoST query message, and wherein modifying the LoST query message comprises replacing the client identifier in the forward path element with the proxy identifier.

17. The method of claim 16, wherein the proxy identifier and the authoritative LoST server identifier are included in a return path element of the LoST response message, and wherein modifying the LoST response message comprises replacing the proxy identifier with the client identifier and replacing the authoritative LoST server identifier with the proxy identifier in the return path element.

18. A non-transitory computer readable medium storing code, executable by a computer processor in a proxy server, for routing requests for a Location-to-Service Translation (LoST) service from a client, the non-transitory computer readable medium comprising:
request code for receiving a request for the LoST service at the proxy server initiated by the client, the request including a location of a user device and a requested service;
identifying code for identifying at the proxy server an authoritative LoST server configured to service the requested service and bounded by a service boundary that includes the location included in the request;
retrieving code for retrieving an identifier of the identified authoritative LoST server; and
routing code for directly forwarding the request for the LoST service from the proxy server to the identified authoritative LoST server using the retrieved identifier, without routing through or querying any other LoST server of a plurality of LoST servers in a forest node structure.

19. The computer readable medium of claim 18, further comprising:
learning code for initially learning service boundaries of the plurality of authoritative LoST servers, including the service boundary of the identified authoritative LoST server, each of the service boundaries indicating a region for which a corresponding authoritative LoST server of the plurality of authoritative LoST servers is responsible.

20. The computer readable medium of claim 18, further comprising:
response code for receiving a response from the identified authoritative LoST server containing at least one identifier corresponding to the requested LoST service; and
routing code for directly forwarding the response to the client, without routing through any other LoST server.

* * * * *